US008215108B2

(12) United States Patent
Hahn et al.

(10) Patent No.: US 8,215,108 B2
(45) Date of Patent: Jul. 10, 2012

(54) CONTROL APPARATUS AND CONTROL METHOD FOR A PISTON/CYLINDER ARRANGEMENT

(75) Inventors: Matthias Hahn, Saarburg (DE); Ralph Lutz, Lorscheid (DE)

(73) Assignee: LAEIS GmbH, Wecker (LU)

( * ) Notice: Subject to any disclaimer, the term of this patent is extended or adjusted under 35 U.S.C. 154(b) by 947 days.

(21) Appl. No.: 12/066,648

(22) PCT Filed: Aug. 14, 2006

(86) PCT No.: PCT/EP2006/008026

§ 371 (c)(1), (2), (4) Date: Oct. 6, 2008

(87) PCT Pub. No.: WO2007/031163

PCT Pub. Date: Mar. 22, 2007

(65) Prior Publication Data

US 2010/0212490 A1 Aug. 26, 2010

(30) Foreign Application Priority Data

Sep. 12, 2005 (DE) ........................ 10 2005 043 367

(51) Int. Cl.
*F16D 31/02* (2006.01)

(52) U.S. Cl. ........................................... 60/469; 60/413

(58) Field of Classification Search .................... 60/413, 60/414, 417, 469, 572, 573

See application file for complete search history.

(56) References Cited

U.S. PATENT DOCUMENTS 6,973,780 B2 * 12/2005 Hahn et al. ...................... 60/413
7,481,161 B2 * 1/2009 Hahn et al. ............... 100/269.18

FOREIGN PATENT DOCUMENTS

| | | | |
|---|---|---|---|
| DE | 3149565 | A1 | 6/1983 |
| DE | 3808389 | A1 | 10/1988 |
| DE | 3734329 | A1 | 4/1989 |
| DE | 4412224 | A1 | 10/1995 |
| DE | 19800721 | A1 | 7/1999 |
| DE | 19822436 | A1 | 10/1999 |
| DE | 10207749 | A1 | 6/2003 |
| DE | 10329067 | A1 | 2/2004 |
| EP | 0661125 | A1 | 7/1995 |
| EP | 1387090 | A2 | 2/2004 |
| WO | 03084704 | A1 | 10/2003 |

* cited by examiner

*Primary Examiner* — Michael Leslie
(74) *Attorney, Agent, or Firm* — Schwabe, Williamson & Wyatt, P.C.

(57) ABSTRACT

A Control apparatus for a piston/cylinder arrangement, having a valve arrangement connected to a first part space, which assumes a closed position preventing a fluid held in the first part space from flowing out if the pressure in the fluid is smaller than a pressure control value set on the valve arrangement and which assumes an opening position if the pressure in the fluid is greater than the set pressure control value, and having a priming device which is coupled to the valve arrangement and the first part space serving to prepare for the damping of a pressure increase in the fluid which is brought about by a movement of the piston caused by a load acting on the piston in the direction of the first part space such that a pressure increase can be generated in the fluid to a predefined pressure priming value independently of the load.

48 Claims, 6 Drawing Sheets

CONTROL APPARATUS AND CONTROL METHOD FOR A PISTON/CYLINDER ARRANGEMENT

CROSS REFERENCE TO RELATED APPLICATIONS

The present application is a national phase entry of, and claims priority under 35 U.S.C. §120 to, International Patent Application No. PCT/EP2006/008026, originally filed Aug. 14, 2006, based on German Application No. 10 2005 043 367.7, originally filed Sep. 12, 2005, entitled "CONTROL APPARATUS AND CONTROL METHOD FOR A PISTON/CYLINDER ARRANGEMENT," and which designates the United States of America, the entire content and disclosure of which is hereby incorporated by reference in its entirety.

TECHNICAL FIELD

The invention relates to a control apparatus for a piston/cylinder arrangement in which the piston/cylinder arrangement has a cylinder and a piston, which is accommodated at least partially in the cylinder and divides the cylinder interior along the cylinder axis into two subchambers, having a valve arrangement that is connected to a first subchamber and assumes a closed position, which prevents a fluid contained in the first subchamber from flowing out of this subchamber if the pressure in the fluid is less than a pressure control value set in the valve arrangement and that opens into an opening position enabling this outflow if the pressure in the fluid is greater than the set pressure control value as well as a method for controlling a piston/cylinder arrangement of this type to execute a relative movement between the piston and cylinder, and the use of a control apparatus of this type for a piston/cylinder arrangement of a hydraulic press.

BACKGROUND

Control apparatuses of this kind for a piston/cylinder arrangement are known, for example, from the press field. In this context, the term "press" is understood to be a generic term for variously functioning hydraulic presses with which it is possible to machine, in particular to shape or manufacture, a wide variety of products through the exertion of hydraulic force. Examples of such presses include hydraulic stamping presses, guillotine shears, presses for the fireproofing and tile industry, presses for manufacturing salt products, products of lime sand brick, tiles, etc. The shaping process for products can be performed in such a way that two extrusion dies, at least one of which is movable along a main axis of the press, are moved in relation to each other and thus execute the shaping procedure. In a press used in the fireproofing industry, loose bulk material, for example, is pressed into a mold by the relative movement of extrusion dies, which mold at least partially establishes the shape of the pressed item manufactured by means of the pressing procedure. By contrast with a stamping press process or guillotine shears process, the end of which is established by the completion of the stamping step or shearing procedure, the shaping procedure of the above-described press from the fireproofing industry is discontinued either when the extrusion dies have traveled a certain distance or when a certain pressure is reached in the main cylinders or when both of these criteria lie within a definite tolerance range.

Piston/cylinder arrangements that are controlled by a control apparatus of the type mentioned at the beginning are used not only for the main cylinders or main extrusion dies, but also for auxiliary functions that can also be performed by piston/cylinder arrangements controlled by the control apparatus. One such auxiliary function, for example, is the movement of a mold wall of a mold after completion of the pressing procedure in an above-introduced press from the application field of the fireproofing industry. This is the so-called demolding of the pressed item from the mold; the pressed item rests against a stationary die or main cylinder while the mold wall is moved relative to the main working axis by means of a movement produced by a piston/cylinder arrangement controlled by the control apparatus, thus removing the mold from the pressed item.

Depending on the arrangement of the auxiliary cylinder controlled by the control apparatus in relation to the press, the demolding procedure can occur as a result of an effective direction oriented in the direction of the extending or retracting piston rod of the auxiliary cylinder. Naturally, if the mold wall is kept stationary, it is also possible to demold the pressed item through a movement of a main cylinder controlled by the control apparatus.

If the control apparatus for a piston/cylinder arrangement is considered in relation to the above-described demolding of a pressed item from a mold, then the valve arrangement that is connected to the first subchamber has the known function of compensating for the own weight of the mold that is coupled, for example, to the piston of such a piston/cylinder arrangement. To that end, a pressure control value is set in the valve arrangement, which value is at least as great as the pressure in a fluid contained in the first subchamber caused by the own weight of the mold. The closing condition is therefore met (without the exertion of additional pressures), the fluid cannot flow out of the first subchamber, and the mold is therefore held in a predetermined position since the own weight is compensated for by the fluid pressure.

However, it has turned out that control apparatuses of the type described at the beginning are only satisfactory to a limited degree with regard to their durability and the durability of the piston/cylinder arrangement that they control in the usual customary technical design since after a relatively short operation time, damages occur in the components of the control apparatus itself, e.g., in position measuring systems or line systems, or damages to the piston/cylinder arrangement, e.g., the welded seams, as well as various other forms of mechanical damage. The observed, less-than-satisfactory service life of components of the control apparatus and of the piston/cylinder arrangement that it controls means that the corresponding parts have to be embodied in a reinforced way since otherwise, they have to be repaired or replaced, which is expensive, and the press may not be operational during repair work, thus resulting in production downtimes.

Attempts have been made to remedy this problem by building dampers such as hydropneumatic shock absorbers into line systems of the control apparatus. Such measures, however, have not had the desired effect.

SUMMARY OF THE INVENTION

In view of the above-described problems inherent in the prior art, an object of the present invention is to produce a control apparatus for a piston/cylinder arrangement of the type mentioned at the beginning, which, when used in a press, on the one hand, has an increased durability itself and on the other hand, also increases the durability of the piston/cylinder arrangement that it controls, thus permitting an extended service life of these parts of the press.

This object is attained in a surprisingly simple fashion by means of a prestressing device, which is coupled to the valve arrangement and the first subchamber and serves to prepare the damping of a pressure increase in the fluid brought about by a movement of the piston, which is caused by a load that acts on the piston in the direction of the first subchamber, and by means of this prestressing device, a pressure increase in the fluid to a predetermined compressive prestressing value can be generated independently of the load.

This invention is based on a precise, thorough analysis of the dynamic pressure conditions in the entire hydraulic system of the control apparatus and the piston/cylinder arrangement. This analysis has yielded the realization that the less-than-satisfactory durability of conventional control apparatuses is due to mechanical stresses, which, in turn are caused by mechanical vibration excitations of the entire hydraulic system. These mechanical vibration excitations occur when a fluid contained in one of the subchambers of the piston/cylinder arrangement is subjected to a pressure increase through a movement of the piston along the cylinder axis and the outflow of the fluid occurs in opposition to a flow resistance. This causes a pressure peak in the hydraulic system, which counteracts the movement of the piston that causes this pressure increase. This induces a vibration excitation, with a correspondingly high mechanical stress for the entire arrangement.

In a control apparatus for a piston/cylinder arrangement according to the invention, however, the pressure increase in the fluid that is generated by the prestressing device provides a compressive prestressing in the fluid. As a result of this compressive prestressing, the natural frequency of the hydraulic axis that corresponds to the piston/cylinder arrangement controlled by the control apparatus is increased, as a result of which pressure peaks that otherwise occur in an undamped fashion, are powerfully damped and consequently can no longer cause damage to occur.

To further illustrate the function of the control apparatus according to the invention for a piston/cylinder arrangement, the above-discussed example of a press used in the application field of the fireproofing industry will be employed again and the above analysis will be explained in the context of this example. In this example, the piston/cylinder arrangement controlled by the control apparatus is used for an auxiliary function for demolding the pressed item from the mold by moving the mold.

It should first be noted that the forces that come into play in the use of such a press in the forming sector are on the order of 4,000 kN to 36,000 kN. If such forces are used to compress and shape loose bulk material in the mold, then a high pressure is also generated on the side walls of the mold, oriented transversely in relation to the main working axis, because the bulk material is pressed against the side walls of the mold with powerful forces oriented transversely in relation to the main working axis. Between the pressed item and the mold wall, there is a correspondingly powerful static friction, even after the end of the shaping procedure. This static friction must be overcome when the piston/cylinder arrangement demolds the pressed item. For this reason, a powerful force is required at least to initiate the movement of the mold.

The precise strength of the force required to overcome the static friction, however, cannot be precisely calculated because it depends on a very large number of parameters, for example, the material that is compressed, the number of cavities in the mold, the pressing force, the dimensions of the pressed item (the surface in contact with the mold wall), etc.

The usual procedure for demolding the pressed item is also carried out as a function of this unknown force required for the demolding. In a (second) subchamber of the cylinder, for example, on the piston side, a pressure is built up relatively slowly, which when a critical value is reached, is sufficient to allow the piston/cylinder arrangement to act on the mold wall with the force required to overcome the static friction. When the static friction is overcome, the transition from static friction to sliding friction occurs abruptly and the piston moves, thus initiating the process of demolding the pressed item.

The movement of the piston that occurs, however, causes an abrupt pressure increase in the other (first) subchamber or more precisely stated, in the fluid contained therein. The reason for this abrupt pressure increase is that during the pressure increase on the piston side—i.e., in the fluid contained on the piston side, a definite compression volume has formed in the pressurized volume of the cylinder chamber on the piston side. The pressure-relief of this compression volume, which occurs in a very short period of time (20 ms), causes the piston to move toward the first subchamber, which produces the abrupt pressure increase therein. As a result of the abrupt pressure increase, the axis, i.e., the fluid contained in the first subchamber, is accelerated very powerfully in the direction of the movement. This can result in calculated acceleration values in excess of 10 g. The volumetric flow of the fluid accompanying this acceleration is usually conveyed to a closed valve arrangement with a preset pressure control value that is higher than a pressure in the fluid that would be generated solely by the own weight of the mold. Depending on the set pressure control value, the axis is finally braked by means of an uncontrolled pressure increase in the first subchamber; a pressure control value set to a high value results in higher delay values than a pressure control value set to a low value. Since in this triggering mode, the valve arrangement is opened only by the pressure pulse that occurs due to the acceleration, this step does not occur "quickly" enough, as a result of which the uncontrolled pressure increase generates a pressure peak in the first subchamber, which can rise to a level up to six times the value of the actual load pressure.

In conventional control apparatuses for the piston/cylinder arrangement, the natural frequency of the axis is low and the damping of the pressure peak is correspondingly weak so that a vibration excitation can occur, accompanied by the above-mentioned negative effects for the machine.

With a control apparatus according to present invention, however, a compressive prestressing in the fluid in the first subchamber is provided, consequently resulting in a high natural frequency of the hydraulic axis. A vibration excitation can no longer occur or is powerfully damped so that the negative effects for the machine are sharply reduced.

Another advantage of the control apparatus according to the invention can be achieved in that the pressure increase is produced specifically so that the pressure in the fluid is as close as possible to, or greater than, the pressure control value. As long as the pressure remains below the pressure control value, the valve arrangement remains in the closed position, but only a correspondingly slight additional pressure increase is required to open the valve arrangement, i.e., the valve arrangement is "quasi-preopened." If the pressure is already greater than the pressure control value, then the valve arrangement is preopened. Naturally in this case, the movement of the piston should occur before the compressive prestressing is too sharply reduced by the resulting (even if only slight) outflow of fluid. In both cases, particularly in the second case, the reaction time of the valve arrangement is also significantly reduced in comparison to a valve arrangement without compressive prestressing. As a result, the outflow of fluid from the first subchamber can occur more quickly, which reduces the intensity of harmful pressure peaks.

Another advantage of the control apparatus according to the present invention is that the compressive prestressing and the (quasi) preopening of the valve arrangement can be produced as a preparatory measure, i.e., not first produced when sensors or other mechanisms register the pressure increase in the first subchamber. This results in a very simple, untemperamental mechanism that prevents the vibration excitation or at least sharply reduces the damaging effects of vibration excitation.

The compressive prestressing value is advantageously equal to the pressure control value or is only slightly greater than the pressure control value, for example, by 0.1% or more, preferably by 0.5% or more, and particularly by 1% or more. It is thus possible to achieve the preopening of the valve arrangement in a satisfactory fashion. Such prestressing values also achieve a satisfactory delay of the axis. It is suitable for the difference between the compressive prestressing value and the pressure control value to be 20% or less, preferably 10% or less, and particularly 5% or less of the pressure control value. As a result, the outflow of fluid remains sufficiently low and the compressive prestressing does not decrease too rapidly.

In a preferred embodiment, the valve arrangement is embodied with at least two stages; it has a main stage whose open/closed position corresponds to the open/closed position of the valve arrangement and which can only assume its open position in the open state of a preliminary stage in which the pressure control value is set; in order to assume the open position after the opening of the preliminary stage, only a relatively low pressure is required in comparison to the pressure control value. Through the use of the above-described two-stage valve arrangement, the preopening of the preliminary stage (the pilot valve) simulates a load on the main stage. This achieves the fact that when the preliminary stage opens, in order to open the main stage, is no longer necessary to use a force that corresponds to the set pressure control value so that the main stage, immediately after being opened, immediately permits an outflow of fluid with a high volumetric flow. The pressure, which is low in comparison to the pressure control value, corresponds to a nonhydraulic closing force provided in the closing mechanism of the main stage.

In this connection, the preliminary stage and main stage provided according to present invention are hydraulically connected to the first subchamber so that the pressure in the fluid on the one hand, is present at a load side of the main stage, whose pressure impingement counteracts the closing of the main stage, and on the other hand, is present at a control side of the main stage, whose pressure impingement counteracts the opening of the main stage, and is also present at the preliminary stage; preferably, the length of a connection between the first subchamber and the control side, at least part of which connection has a bypass line, is greater than the length of a connection between the first subchamber and the load side. The term "bypass line" here means a bypass of the load side of the main stage. The length of the connection here is not necessarily understood to be a spatial length, but instead as a measure of the time required for a pressure to spread along the connection. Thus, for example, a throttle system produces a "lengthening" of the connection.

The main stage is therefore hydraulically pressure-compensated both when the preliminary stage is closed and—provided that no flow forces are occurring, i.e., the axis is at rest—when the preliminary stage is preopened; but the main stage is closed by a non-hydraulically acting closing device such as a spring. The spring can advantageously exert a spring force, converted into pressure terms, of 0.5-20 bar, preferably 1-10 bar, and particularly 3-5 bar. A pressure increase in the fluid caused by the movement of the piston reaches the load side of the main stage in a time-shifted fashion before reaching the preliminary stage and also before reaching the control side of the main stage, resulting in the fact that the main stage opens due to the effect of the lower pressure on the control side than on the load side, which permits the outflow of fluid to occur via the main stage. This advantageously results in only a minimal lag (if any) caused by the opening of the preliminary stage and the subsequent full opening of the main stage. As soon as the pressure in the fluid falls below the pressure control value due to the outflow of fluid, the closing device closes the main stage.

The load-independent pressure increase of the fluid provided according to the present invention is advantageously produced from a reservoir system that is coupled to the first subchamber/valve arrangement via a line system. The achievement of the compressive prestressing independent of the cycle can therefore be implemented in a particularly simple fashion. In this case, a reservoir system possibly already present in control apparatuses of this kind can be used for this additional function. Another advantage of the compressive prestressing produced independent of the cycle lies in the fact that vibration excitations are not transmitted to the damping circuit of the valve arrangement, as a result of which the main stage demonstrates a stable transient response. It is thus possible to assure a reliable braking of a piston movement.

The coupling of the reservoir system to the valve arrangement via the corresponding line system suitably occurs directly in a pilot control line between the control side of the main stage and the preliminary stage. It is thus possible to sharply reduce repercussions that pressure increases in the first subchamber have on the reservoir system itself.

In addition, a throttle system or throttle systems can be provided in the line system connecting the reservoir system to the pilot control line, in the pilot control line, and/or in a section of the bypass line between the load side and the control side of the main stage. Consequently, the pressure conditions remain unchanged in the static state of the fluid, but during dynamic operation, reductions in volumetric flow and a "lengthening" of connection lengths (see above) can be achieved, which permit a reliable outflow of the fluid in the desired fashion, essentially entirely via the main stage.

In a particularly simple embodiment of the control apparatus, the pressure increase in the fluid can be produced not only in a control position, but on a continuous basis.

Preferably, the pressure control value set in the valve arrangement can be adjustable, i.e., in particular, the maximum compressive prestressing value can be adjustable. In a structurally simple embodiment, this can be achieved on the one hand through manual adjustment. On the other hand, for the grouping of the overall control, it is more advantageous if the pressure control value is proportionally controllable and in particular, is set by a control unit through a predetermined control voltage and the control voltage is magnetically converted to a pressure control value. In this context, the expression "proportionally controllable" means that the set pressure control value is proportional to the control voltage predetermined by the control unit.

In a particularly suitable embodiment of the present invention, the reaction time of the valve arrangement after prestressing is now less than 50 ms, preferably less than 20 ms, and in particular less than 5 ms. It is thus possible, as has already been explained above, to further reduce the intensity of a developing pressure peak.

The previously presented defining characteristics of the control apparatus according to the invention relate to the problems that arise at the beginning of a relative movement between the piston and cylinder of the piston/cylinder arrangement, particularly if the movement occurs with the abrupt overcoming of a holding force counteracting the movement, for example, the breakaway moment in the procedure of demolding a pressed item from a mold. Another aspect of the present invention relates to the continuation of a demolding procedure begun in this way.

To that end, it is advantageous that a supply of the second subchamber with a hydraulic fluid—which is required for a hydraulically generated relative movement of the piston in the direction of the first subchamber—can occur in a first operating mode by means of a first volumetric flow of hydraulic fluid coming from a pump system at least partially via a first line system and can occur in a second operating mode by means of a second volumetric flow of hydraulic fluid coming from a reservoir system at least partially via a second line system, and means are provided for switching from the first operating mode to a second operating mode. In this way, it is only necessary for the pump system to be available for the relative movement during the activation of the first operating mode.

It is particularly advantageous if the means for the switching are equipped with means for producing an increase in the pressure prevailing in the first line system, means for automatically opening a communication between the reservoir system and the second subchamber when the pressure prevailing in the first line system exceeds a predetermined threshold in a first triggering mode, and means for maintaining this communication in a second triggering mode. As a result, the automatic opening of the communication between the reservoir system and the second subchamber—without additional required sensors or control commands in the changing of the pressure source from which the hydraulic fluid supply is fed—causes no instabilities and initiates a satisfactory transition between the two operating modes.

Preferably, the pressure increase is produced by throttling the first volumetric flow of hydraulic fluid by means of a throttle valve. It is thus possible for the transition from an impeller control mode to a pure throttle control mode to occur with no losses of dynamic characteristic values. In a suitable fashion, the throttle valve is embodied as proportionally controllable, which enables a simple central control. It is also possible for the throttle valve to perform still other functions, e.g., a general switching of the direction of the relative movement. A throttling of the first volumetric flow of hydraulic fluid, however, also results in a braking of the relative movement so that the first triggering mode can be characterized as a brake triggering mode. By contrast, the second triggering mode can be characterized as a positioning triggering mode, which is selected for the switching (and which can be maintained during the second operating mode).

During the impeller control from the pump system, the pressure produced by the pump system and prevailing in the first line system is essentially lower than the pressure prevailing in the reservoir system. The pressure threshold at which the opening to the reservoir system occurs automatically is advantageously determined here essentially by the pressure prevailing in the reservoir system, but is slightly higher than it. A pressure that is already present in the arrangement is used as an essential threshold criterion, which permits particularly simply structured implementations of the automatic opening.

A significant advantage is achieved if the control apparatus permits an excess portion of the first volumetric flow of hydraulic fluid to be transferred into the reservoir system; if the first volumetric flow of hydraulic fluid is maintained unchanged, this excess portion comes into being when the throttling of the first volumetric flow of hydraulic fluid occurs. Specifically speaking, the pump system reacts more slowly than a throttling produced in particular by means of a throttle valve. If it were not possible for the resulting excess portion of the first volumetric flow of hydraulic fluid to be conveyed into the reservoir system, then harmful pressure peaks would in turn be produced in the first line system. This diversion of the fluid also recharges the reservoir system.

A preferred implementation of the means for opening the communication to the reservoir system is provided in the form of a connecting valve arrangement, which has a reservoir connecting valve with a first connection that communicates with the first line system and a second connection that communicates with the second line system, whose respective pressure impingement counteracts the closing of the reservoir connecting valve; the opening of a communication between the first connection and the second connection occurs by means of an unblocking achieved through an opening of the reservoir connecting valve. In this way, the opening action can be produced in a particularly simple fashion, to be precise, simply through an (automatic) opening of the reservoir connecting valve.

According to another provision, the reservoir connecting valve has a third connection whose pressure impingement counteracts the opening of the reservoir connecting valve and is determined by a valve group coupled to the third connection, which group has a first valve that is opened in the first triggering mode and opens a communication from the third connection to the second line system. Such a valve group makes it possible, with a simple design, to exert a pressure required to close the reservoir connecting valve.

In a particularly suitable embodiment, in the reservoir connecting valve, the sum of the effective surfaces of the first connection and second connection is essentially equal to the effective surface of the third connection, while a closing element is provided, particularly in the form of a spring, which in compensated pressure conditions, executes the closing of the reservoir connecting valve with a force, the compensation of which requires a compensation pressure that corresponds, in converted terms, to the effective surface of the first connection and with which the predetermined threshold is determined by the sum of the pressure prevailing in the reservoir system and the compensation pressure. Such a reservoir connecting valve can be simply embodied in the form of a 2/2-way insertion valve. The expression "compensated pressure conditions" means that a hydraulically dictated force equilibrium is present, i.e., the sum of the product of the first effective surface with the pressure that is present against it plus the product of the second effective surface with the pressure that is present against it is equal to the product of the third effective surface with the pressure that is present against it. In the case of this force equilibrium, the closing element determines the position of the reservoir connecting valve.

Once connected, the communication with the reservoir system can be maintained with particular ease because the valve group has a second valve, which, in the open position in the second triggering mode, relieves the pressure on the third connection and makes it possible to maintain the communication between the reservoir system and the second subchamber, in particular after the opening of this communication is registered by a sensor provided in the reservoir connecting valve. This complete pressure relief quickly reduces the hydraulic difference in relation to the opening of the reservoir connecting valve. Consequently, the change from the first triggering mode (brake triggering mode) to the second triggering mode (positioning triggering mode) can occur without a significant loss of time.

In a preferred embodiment of the control apparatus, additional means are provided for preventing the opening of the communication with the reservoir system in a third triggering mode. This is advantageous if a pressure that is higher than the one prevailing in the reservoir system is to be built up in the first line system in order, for example, to exert the required pressure to overcome a holding force counteracting the movement of the piston. If the communication between the reservoir and the second subchamber were also opened in this instance, then such a buildup of pressure would not be possible. Consequently, the third triggering mode can also be characterized as a pressure buildup triggering mode.

A structural implementation that is particularly advantageous for this purpose is produced if the valve group has a third valve, which, in the open position in the third triggering mode, through a communication between the third connection and the line system—selected from the first and second line systems—in which a higher pressure prevails, the reservoir connecting valve is locked in the closed position; in particular, this selection of the line system occurs automatically by means of a fourth valve coupled to both line systems. In this case, the fourth valve can suitably be embodied in the form of a simple shuttle valve.

In the second triggering mode (positioning triggering mode), as soon as the communication between the reservoir system and the second subchamber is reliably maintained, it is in principle possible for the pump system to be switched off. In a preferred embodiment, however, the pump system is merely switched away from this connection by means of a decoupling valve and the pump system remains available for other functions, for example, a triggering of additional piston/cylinder arrangements.

The present invention relates not only to a control apparatus for a piston/cylinder arrangement, but also to a method for operating a piston/cylinder arrangement; a control method of this kind can in particular be carried out by means of a control apparatus of the type described above.

In the method according to the invention for controlling a relative movement between the piston and cylinder of a piston/cylinder arrangement, in a first method step, a relative movement between the piston and cylinder of the piston/cylinder arrangement is produced in an impeller control mode by means of a first volumetric flow of hydraulic fluid that is generated by a pump system and functions as a hydraulic fluid supply, in a second method step, through a throttling of the first volumetric flow of hydraulic fluid that continues to be generated by the pump system, a transition is initiated from the impeller control mode to a throttle control mode and therefore a braking of the relative movement is initiated, in the process of which an excess portion of the first volumetric flow of hydraulic fluid brought about by the transition is conveyed into a reservoir system through an automatic opening of a communication between the pump system and the reservoir system, and, in a third method step, this communication is maintained, and the hydraulic fluid supply for the braked relative movement occurs by means of a second volumetric flow of hydraulic fluid coming from the reservoir system via the communication.

This method combines the advantages on the one hand, of being able, for example, to carry out an acceleration and fast-motion travel of the piston in the piston/cylinder arrangement in the impeller control mode with only a slight conversion of hydraulic pressure energy into heat and on the other hand, to carry out a braking movement of the piston out of the reservoir system, which leaves the pump system free for other tasks. It is also advantageous that the transition of the hydraulic fluid supply from the pump system to the reservoir system is initiated automatically and occurs without instabilities.

The throttling process suitably begins at a braking time calculated by a control unit. It is thus possible to transition from both operating modes into each other while maintaining a particularly efficient chronological sequence.

Preferably, the automatic opening occurs by means of a reservoir connecting valve, which is controlled by a valve group, is coupled to the pump system via a first line system that communicates with a first connection, and is coupled to the reservoir system via a second line system that communicates with a second connection, and a first valve of the valve group is open in a first triggering mode—in particular when not triggered by a control unit—and in the open state, produces the automatic opening action as soon as the pressure in the first line system exceeds a predetermined threshold due to an increase caused by the throttling. In this way, in the control method, the switching between the hydraulic fluid supplies can be carried out in a particularly uncomplicated fashion in that the control unit only has to control the triggering of the valve group.

The maintenance of the communication between the reservoir system and the second subchamber occurs in a suitable fashion in that in the third method step, a second valve of the valve group is opened in a second triggering mode—in particular through a triggering of the control unit; this opening relieves the pressure in a third connection of the reservoir connecting valve, thus achieving the maintenance; and the triggering is initiated by the control unit, particularly in that a sensor provided in the reservoir connecting valve registers the opening and conveys a corresponding signal to the control unit while the first valve—in particular through a triggering by the control unit—is closed, and the first volumetric flow of hydraulic fluid is switched away from the communication with the second subchamber. The opening of the second valve thus relieves the pressure in the third connection of the reservoir connecting valve, causing this valve to remain continuously open. As a result, the first volumetric flow of hydraulic fluid can then be switched to another purpose. The switching of the first and second valve can advantageously occur without any loss of time if immediately after the opening, a sensor registers it and immediately conveys a corresponding signal to the control unit.

After the third method step, the relative movement of the piston is controlled by a throttle control supplied from the reservoir system. Now, in a fourth method step in a second triggering mode, through a throttling of the second volumetric flow of hydraulic fluid from the reservoir system, the relative movement is suitably brought to a stop with the assumption of a desired relative movement end position between the piston and cylinder. In this way, it is possible to achieve a positioning between the piston and cylinder to a precision of 0.01 mm.

If need be, it can be useful, even before the first method step, to carry out a preparatory method step in which a third valve of the valve group is opened in a third triggering mode—in particular through the triggering of the control unit, the first valve is closed in particular through the triggering of the control unit, the second valve is closed in particular through a nontriggering of the control unit, the opening is prevented in that a communication between the third connection and the line system—selected from the first and second line systems—in which a higher pressure prevails, the reservoir connecting valve is locked in the closed position, and in particular, the selection of this line system occurs automatically by means of a fourth valve coupled to both line systems.

This is useful particularly if a holding force opposing the piston movement must be overcome before the actual movement can begin and to that end, a pressure buildup in the second subchamber and therefore also in the first line system is produced, which exceeds the pressure in the reservoir system. The third triggering mode can therefore be characterized as a pressure buildup triggering mode.

With regard to the production of the compressive prestressing in the fluid contained in the first subchamber, the present invention provides a control method in which independent of a load acting on the piston in the direction of the first subchamber, a pressure increase to a predetermined compressive prestressing value is produced in the fluid. As explained above, this assures that after the initiation of the movement, no harmful effects can arise due to a vibration excitation. In particular, this method is to be suitably carried out by means of the control apparatus with the above-explained specifications.

Then, by means of a volumetric flow of hydraulic fluid produced by a pump system, the pressure in a hydraulic fluid contained in the second subchamber can be increased and along with it, the load, until the movement of the piston in the direction of the first subchamber is initiated. Particularly if the movement of the piston is opposed by a load whose magnitude is not known in advance, as is the case with the procedure of demolding a pressed item from a mold, the movement only begins once a breakaway moment is reached. In such a case, the pressure increase in the second subchamber can occur slowly. It is thus possible, among other things, to prevent the pump system from continuing to exert pump capacities that can no longer be used.

Then, the additional method steps described above that are required for moving and positioning the piston can be carried out; in particular, the preparatory method step is carried out before the movement of the piston is initiated and in particular, a control unit switches over to the impeller control mode by means of the first volumetric flow of hydraulic fluid as soon as a distance measuring system has registered the initiation of the movement and has conveyed a corresponding signal to the control unit.

The control method and control apparatuses presented according to this invention can be used in a meaningful way for piston/cylinder arrangements in a wide variety of application types, particularly when a relative movement between the piston and cylinder is only possible after the overcoming of a holding force. In particular, however, the control apparatus is intended for use with a hydraulic press, in particular to be used in the fireproofing and tile industry; the piston/cylinder arrangement controlled by the control apparatus is in particular used for the procedure of demolding a pressed item from a mold, which has already been described by way of example above.

BRIEF DESCRIPTION OF THE DRAWINGS

Embodiments of the invention are explained below with reference to the drawings, to which reference is made with respect to all details that are material to the embodiments.

FIG. 2 is a schematic depiction of the control apparatus with a piston/cylinder arrangement connected to it.

FIG. 3 is an enlarged section of the control apparatus from FIG. 2, which illustrates a connecting valve arrangement.

DETAILED DESCRIPTION OF EMBODIMENTS OF THE INVENTION

The components of the control apparatus, their arrangement, and their operation are described below. Then the control method for the piston/cylinder arrangement is described in conjunction with the example of a procedure for demolding a pressed item from a mold in a hydraulic press.

Figure 1:
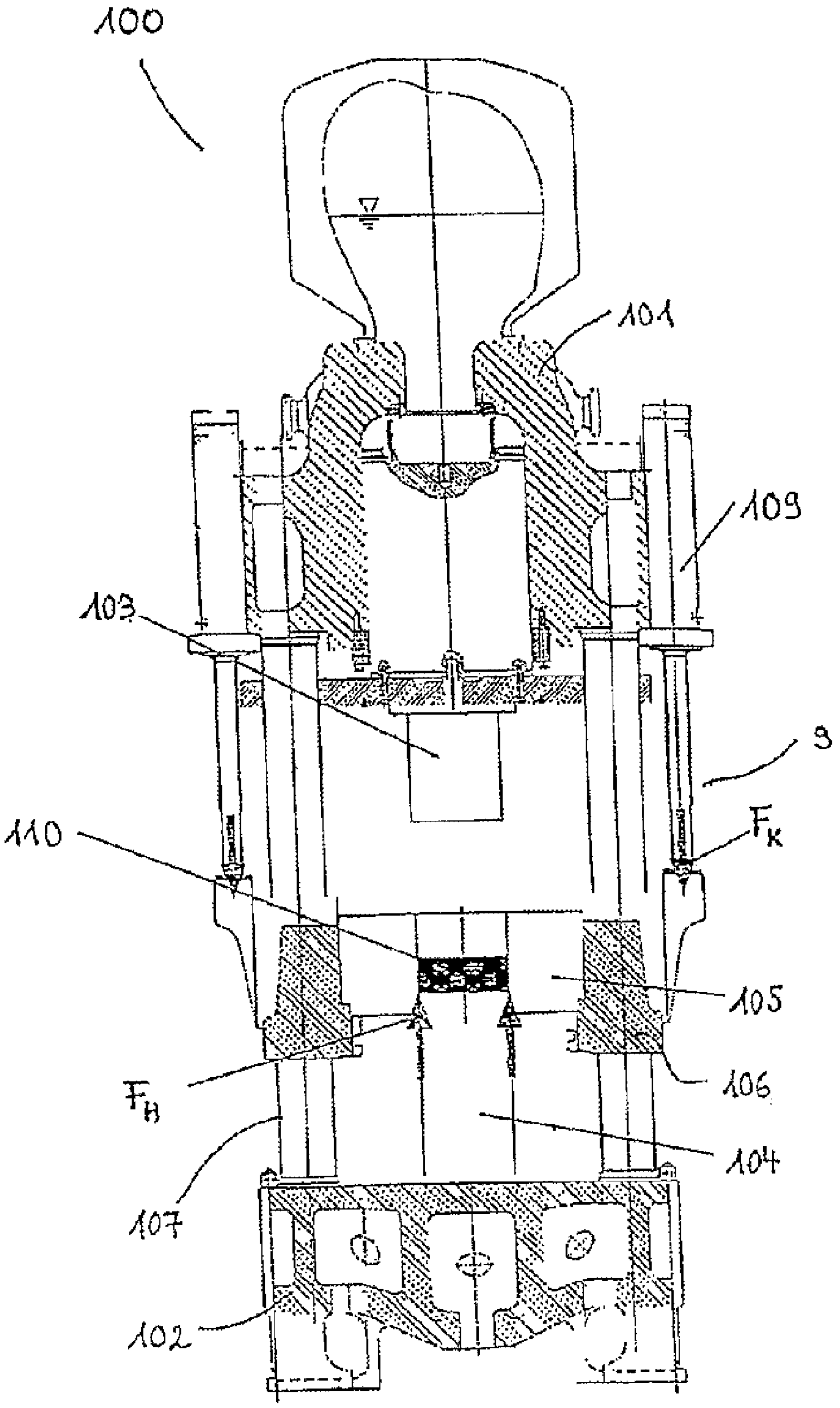
FIG. 1 illustrates a schematic longitudinal section through a hydraulic press whose piston/cylinder arrangements can be controlled by the control apparatus according to the invention and can be operated by means of the control method according to the invention.

FIG. 1 illustrates a longitudinal section through the basic structure of a hydraulic press 100. The hydraulic press 100 has an upper arbor 101 and a lower arbor 102; the upper arbor 101 is supported above the lower arbor 102 on movement columns 107. A fixed lower die 104 fastened to the lower arbor 102 protrudes perpendicularly upward. Situated on the upper arbor 101 is a moving upper die 103, which, together with the lower die 104, constitutes the main working axis of the hydraulic press 100 and which, by moving toward the lower die 104, is able to compress loose bulk material situated between the lower die 104 and upper die 103 into a brick (pressed item) 110. A mold 105 determines the shape of the pressed item at the sides. The mold 105 is affixed to a mold wall 106, which is supported so that it is able to move along the movement columns 107. The movement of the mold wall is produced by piston/cylinder arrangements 109 whose pistons 9, by means of an ejecting movement with a piston force $F_K$, move the mold 106 away from the pressed item in a demolding procedure. In order to be able to initiate such a traveling movement, however, the piston force $F_K$ must overcome a static friction force $F_H$ between the pressed item 110 and the side walls of the mold 106.

Figure 2A:
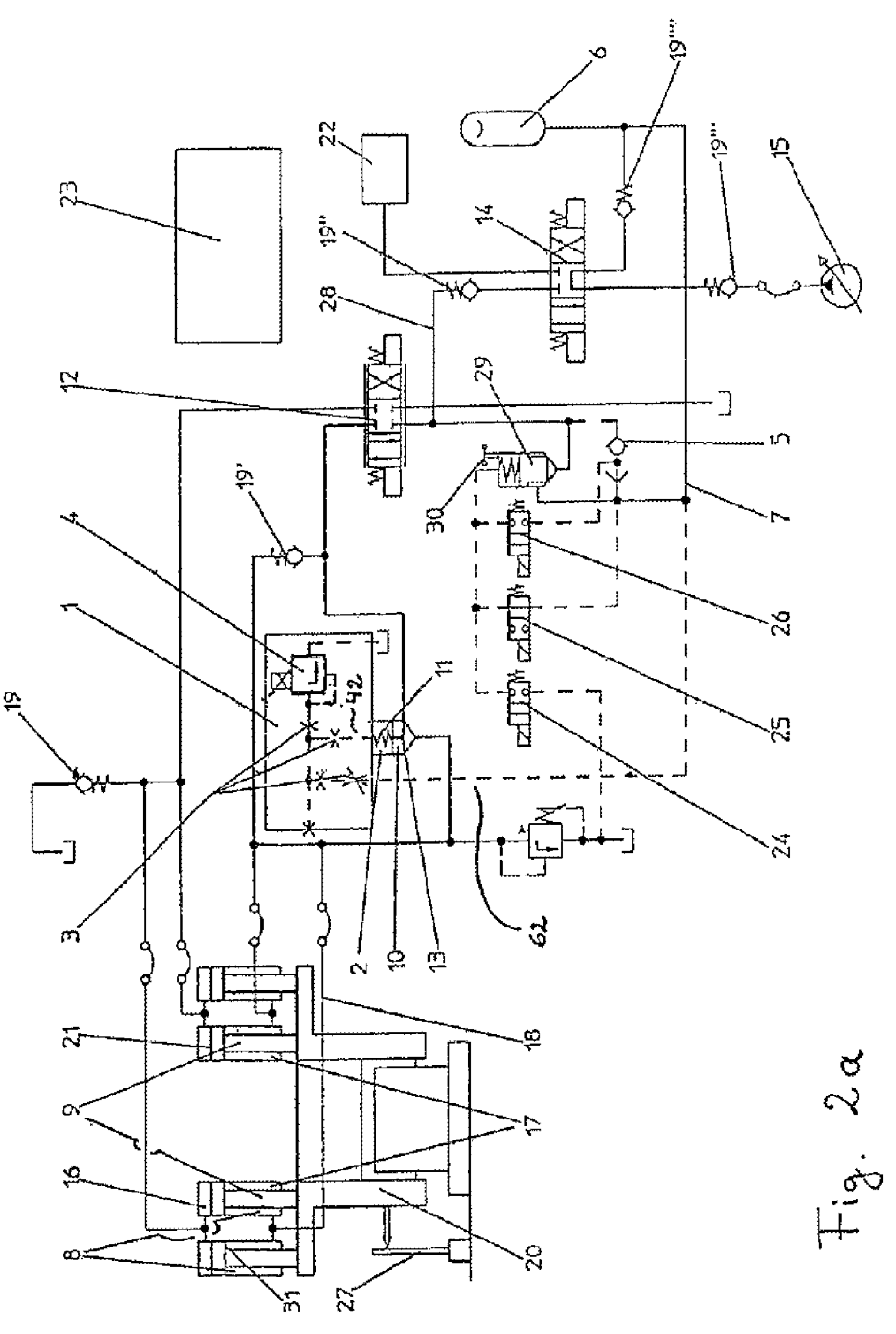
FIG. 2*a* introduces the components of the control apparatus.

FIG. 2*a* illustrates the components of the control apparatus in a control diagram. In this exemplary embodiment, four piston/cylinder arrangements are provided, whose pistons 9 are affixed to the mold 20 (106 in FIG. 1). Each piston divides the inner chamber of the cylinder of its associated piston/cylinder arrangement into two subchambers, in this case an annular surface chamber 8 of the cylinder (first subchamber) through which the piston 9 itself passes and a piston surface chamber 16 of the cylinder (second subchamber). A fluid 17 contained in the cylinder annular surface chamber 8 counteracts an extending movement of the piston 9 out from the cylinder by means of pressure on a cylinder annular surface 31 functioning as an effective surface. In this instance, the fluid 17 is a suitable hydraulic fluid. Correspondingly, a hydraulic fluid situated in the cylinder piston surface chamber 16 counteracts a retracting motion of the piston 9 by means of pressure on a cylinder piston surface 21 functioning as an effective surface and can, if necessary, produce an extending motion of the piston 9.

These four piston/cylinder arrangements are now controlled by a control apparatus, which has a pump system 15 and a reservoir system 6 that are coupled to the piston/cylinder arrangements via a plurality of valves and line systems and, depending on the switched position of the plurality of valves, can change the pressure conditions in the cylinder annular surface chambers and/or the cylinder piston surface chambers and can naturally produce extending or retracting movements of the pistons 9. In this case, a control unit 23 electronically carries out the control of the pump system 15 and of the valves and valve arrangements described in detail below.

First, a description will be given of the operation and connections of the pump system 15. A check valve 19''', which prevents a first volumetric flow of hydraulic fluid coming from the pump system 15 from flowing back into the pump system 15, connects the pump system 15 to a decoupling valve 14 embodied in the form of a directional control valve. Depending on the switched position of the decoupling valve 14, the first volumetric flow of hydraulic fluid can be conveyed to the reservoir system 6 via an additional check valve 19'''' in order to feed it into the reservoir system 6. FIG. 2*a* illustrates the decoupling valve 14 switched in a corresponding fashion. In another switched position of the decoupling valve 14 symbolized by the crossed arrows, the first volumetric flow of hydraulic fluid can be used for another triggering mode 22, e.g., for the main axis (upper die) of the hydraulic press depicted in FIG. 1. In another switched position of the decoupling valve 14 depicted in FIG. 2*c*, the first volumetric flow of hydraulic fluid travels to another directional control valve, i.e., the throttle valve 12, to a base surface connection A (first connection) of a reservoir connecting valve 29, and to a shuttle valve 5 (fourth valve), the latter of which will be described below. Depending on the switched position of the throttle valve 12, the first volumetric flow of hydraulic fluid can either be blocked by a throttling down to a zero passage or a communication with the piston/cylinder arrangements is produced. This can occur via an additional check valve 19' and a tube system 18 either to the cylinder annular surface chambers 8 or in the switched position of the throttle valve 12 illustrated in FIG. 2*c*, to the cylinder piston surface chambers 16. The directional control valve 12 is proportionally controllable with regard to the throttling.

Figure 2B:
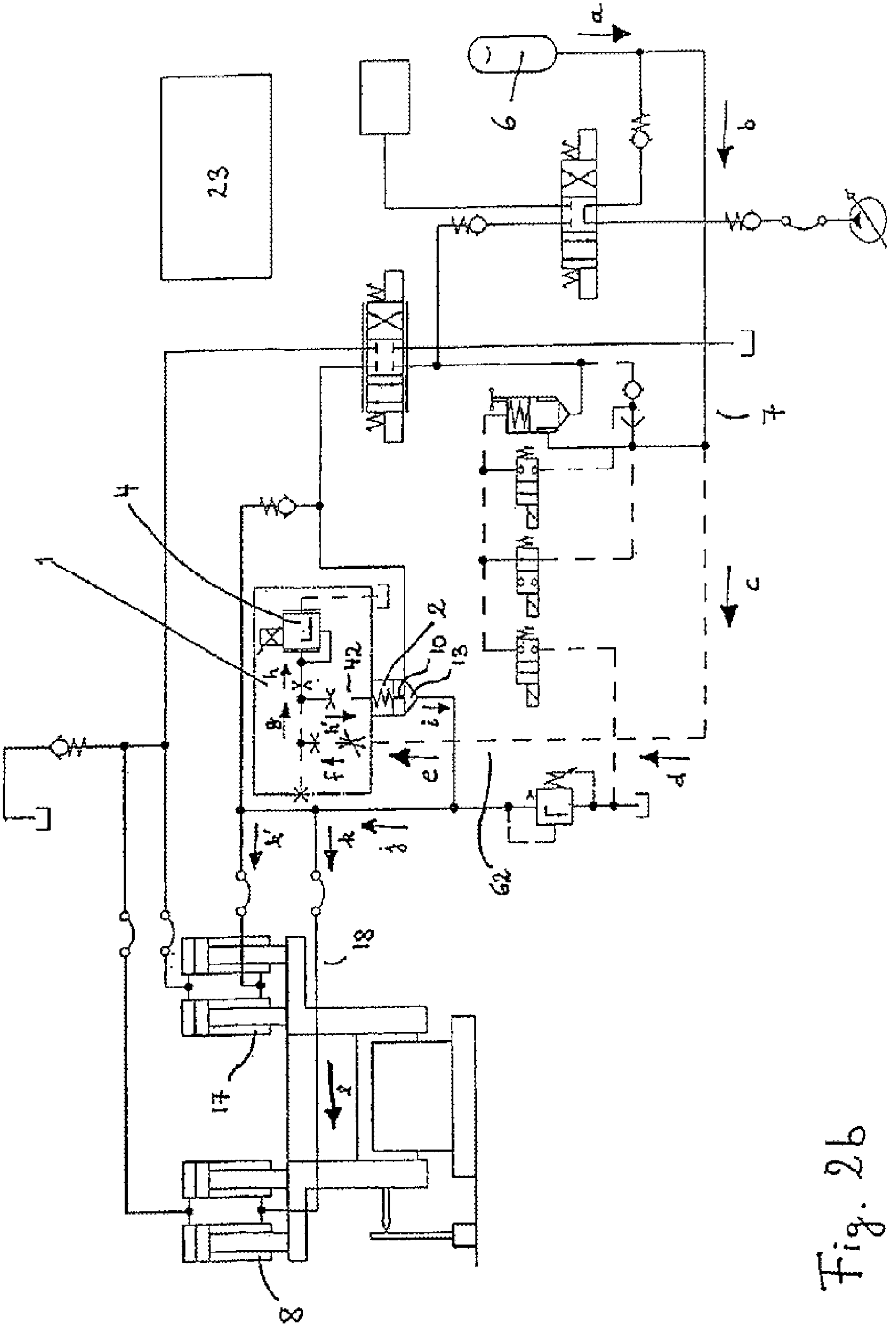
FIG. 2*b* illustrates how a compressive prestressing is produced in the piston/cylinder arrangement.
Figure 2C:
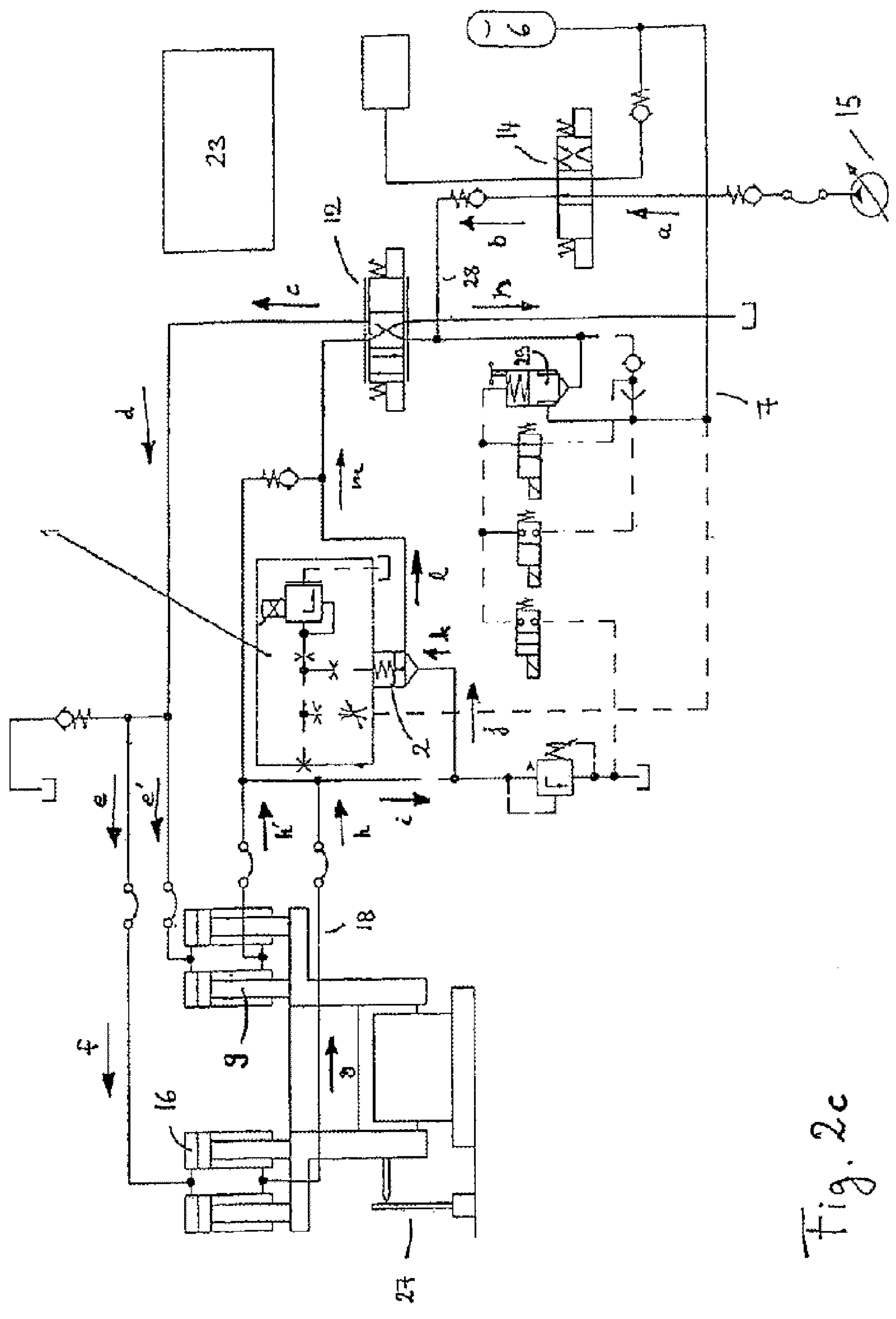
FIG. 2*c* illustrates the pressure situation in the control apparatus at a time in which a relative movement is initiated between the piston and cylinder of the piston/cylinder arrangement.

If the first volumetric flow of hydraulic fluid from the pump system 15 is directed to the cylinder piston surface chambers 16, as indicated by the arrows a-f in FIG. 2*c*, then a pressure increase can be produced in the cylinder piston surface chambers 16.

Whether such a pressure increase in the cylinder piston surface chambers 16 also leads to an extending movement of the pistons 9 depends, among other things, on whether a load compensation valve 1 (valve arrangement), which is connected to the cylinder annular surface chambers 8 via a tube system 18, is open or closed. If the load compensation valve 1 or its main stage 2 is open, then the fluid 17 contained in the cylinder annular surface chambers 8 can flow out into a tank via the tube system 18, the open main stage 2, and the throttle valve 12. Such a flow path is depicted in FIG. 2*c* by the arrows g-n.

However, even the own weight of the mold 20 coupled to the pistons 9 represents a load that would by itself already produce an extending movement of the pistons 9. Such an extending movement, however, is not desirable and is prevented by the load compensation valve 1 as follows. A pressure control value is set in the load compensation valve 1 and an opening of the load compensation valve 1 and therefore the outflow of the fluid 17 from the cylinder annular surface chambers 8 can only occur if the pressure in the fluid 17 exceeds the set pressure control value. The pressure control value P required for the load compensation here is calculated as follows: $P=F/A_{31}$, where F is the force produced by the own weight of the mold 20 and $A_{31}$ is the sum of all cylinder surfaces 31.

The load compensation valve 1 here is composed of a main stage 2 and a preliminary stage 4 that functions as a pilot valve and pilot-controls the main stage 2. The set pressure control value is present at the pilot valve 4 and the pilot valve opens 4 when the pressure in a pilot control line 42 present at the pilot control valve 4 exceeds the set pressure control value. The pilot control line 42 is in turn connected via an orifice 13 with a throttling action to the tube system 18 and therefore to the cylinder annular surface chambers 8. This means that in the static state, the pressure of the fluid 17 is also present at the pilot valve 4 via the pilot control line 42. On the other hand, this pressure is present not only at a load side of the main stage 2 that counteracts the closing of the main stage 2, but also at a control side of the main stage 2 that counteracts the opening of the main stage 2. Since a spring 11 built into the main stage 2 counteracts the opening of the main stage 2, the main stage 2 remains closed as long as the pressure on the control side of the main stage 2 is not relieved by the opening of the pilot valve 4 and the main stage 2 opens at the spring force of the spring 11, which is the only force that remains to be overcome and in this exemplary embodiment, is only 4 bar, in converted units. The opening and closing of the main stage is produced directly by a piston 10, which also includes the orifice 13. The pilot valve 4 itself is a known, directly and proportionally controlled pressure-relief valve; the closing mechanism is magnetic and is controlled proportionally in relation to a control voltage predetermined by the control unit 23.

In this exemplary embodiment, the prestressing device according to the invention includes the reservoir system 6, the (second) line system 7 with a section 62, and orifice plates 3. The coupling of the reservoir pressure occurs through a connection of the section 62 to the pilot control line 42. The compressive prestressing in the fluid 17 contained in the cylinder annular surface chambers 8 and tube system 18 is supplied from the reservoir system 6 along the path indicated by the arrows a-l in FIG. 2*b*.

It has already been stated that the first line system 28 has a connection to both the reservoir connecting valve 29 and the shuttle valve 5. In addition, the reservoir system 6, as illustrated in FIG. 2 and in particular FIG. 3, is connected via the second line system 7 to an annular surface B of the reservoir connecting valve 29. The reservoir connecting valve 29 itself is a 2/2-way insert valve in which the effective surface of the connection to the base surface A corresponds to the so-called 100% effective surface, the effective surface of the connection to the annular surface B corresponds to the so-called 50% effective surface, and the effective surface of the additionally provided connection to the control surface C corresponds to the so-called 150% effective surface. Pressures on the effective surfaces A and B counteract the closing of the reservoir connecting valve 29, whereas a pressure on the effective surface C, together with the converted pressure of a closing spring—which in this exemplary embodiment comes to approximately 4 bar, counteract the opening of the reservoir connecting valve 29. Naturally, the effective surfaces do not actually have to be in the ratio 100%, 50%, 150% to one another, but the effective surface 150% should equal the sum of the two effective surfaces 100% and 50%. In other words, in the event of a pressure equilibrium among all of the effective surfaces A, B, and C, the reservoir connecting valve 29 is closed by the action of the closing spring.

The pressure present against the 150% effective surface (control surface C) is determined by the switching of a valve group composed of an off/on valve 25 (first valve), the on/off valves 24, 26 (second and third valves), and the shuttle valve 5. In this connection, the expression “off/on valve” (valve 25) means that in its normal switched position, i.e., when it is not triggered, the valve is open and is closed when it is triggered by the control unit 23. Intermediate positions are not illustrated. Accordingly, the on/off valves 24 and 26 are opened by the triggering of the control unit 23, whereas they are closed in their normal position. Each of the valves 24, 25, and 26 when open produces a connection to the control surface C of the reservoir connecting valve 29. When the valve 25 is open, this connection couples to the second line system 7 and therefore establishes a pressure-carrying coupling to the pressure in the reservoir system 6. The connection produced by the open valve 24 couples to a tank and thus completely relieves the pressure on the control surface C of the reservoir connecting valve 29. The connection by means of the open valve 26 couples to the shuttle valve 5. This valve is designed so that it couples the control surface C of the reservoir connecting valve 29 to the first line system 28 when the pressure in the first line system 28 is greater than the pressure in the second line system 7 and conversely, couples the control surface C to the second line system 7 when the pressure in the second line system 7 is greater than the pressure in the first line system 28.

It is thus provided that only one of the respective valves 24, 25, or 26 is open, while the two others are closed. In a brake triggering mode (first triggering mode), the valve 25 is open while the valves 24 and 26 are closed. This triggering mode corresponds to the normal switched position of the three valves 24, 25, and 26 since none of them is being triggered by the control unit 23. In a positioning triggering mode (second triggering mode), the valve 24 is triggered and opened while the valve 25 is triggered and closed and the valve 26 is not triggered and remains closed. In a pressure buildup triggering mode (third triggering mode), the valve 26 is triggered and opens while the valve 24 is not triggered and remains closed, and the valve 25 is triggered and closed. In the pressure buildup triggering mode, the reservoir connecting valve 29 is always closed.

Finally, additional systems are provided, which send the control unit 23 signals communicating certain information about the current state of the control apparatus. For this purpose, the reservoir connecting valve 29 is provided with a sensor 30, which notifies the control unit 23 as to whether the reservoir connecting valve 29 is open or closed. In particular, the sensor 30 immediately signals the control unit 23 if the reservoir connecting valve 29 opens in the brake triggering mode.

A distance measuring system 27 is also provided, which signals the control unit 23 as to the position of the mold 20 and therefore also the position of the pistons 9 in relation to the piston/cylinder arrangements. In particular, the distance measuring system 27 signals the control unit 23 immediately if, during the demolding procedure, the movement of the mold 20 and pistons 9 starts abruptly after the overcoming of the static friction between the pressed item and mold 20.

Finally in this exemplary embodiment, a pressure-relief valve is additionally provided, which is coupled to the tube system 18 and in emergencies, for example, can assure a pressure relief of the fluid 17, accompanied by an additional tank coupled to the supply line to the cylinder piston surface chambers 16 via a check valve 19, from which tank the cylinder piston surface chambers 16 can draw hydraulic fluid by suction so that during an extending movement of the pistons 9, no vacuum can build up in the cylinder piston surface chambers 16.

A method for operating the piston/cylinder arrangements is thoroughly described below and in this exemplary embodiment, permits execution of the complete procedure for demolding a pressed item from the mold 20. The starting point for the method is the situation illustrated in FIG. 1 in which the loose bulk material has already been pressed into a brick 110 by the hydraulic press 100; now, the mold 105 must be moved downward by the piston/cylinder arrangements 109 in opposition to the resistance of the static friction force $F_H$.

Figure 3A:
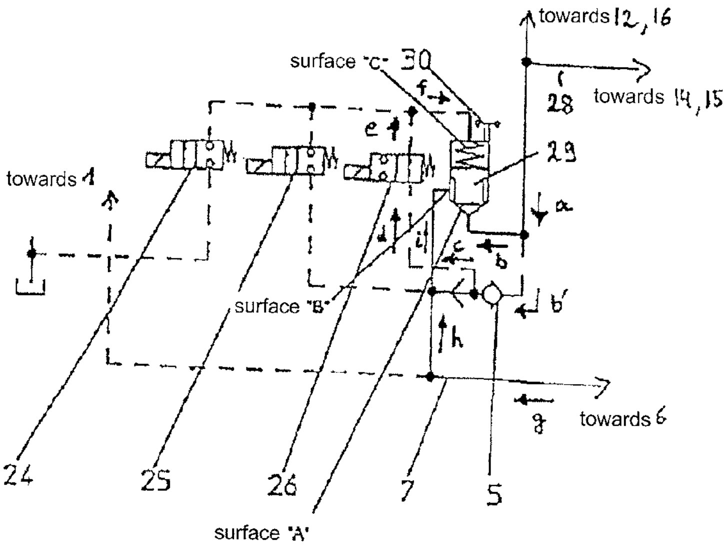
FIG. 3*a* illustrates the coupling of a valve group and the pressure situation in a third triggering mode (pressure buildup triggering mode).

First, the compressive prestressing in the fluid 17 in the cylinder annular surface chambers 8 and the tube system 18 is produced by means of a pressure increase from the reservoir system 6. This is indicated by the arrows a-l in FIG. 2*b*. The pressure in the fluid 17 is brought to a predetermined compressive prestressing value, which is set to be equal to the pressure control value set in the pilot valve 4 so that when the compressive prestressing is produced, the pilot valve 4 is opened while the main stage of the load compensation valve 1 remains closed but in a “quasi-preopened” state since its opening can be achieved with only a relatively slight additional pressure increase in the fluid 17 (corresponding to the 4 bar of converted spring force). At the same time, the 2/2-way valve 12 can already be switched to the switched position, illustrated in FIG. 2*c*, of the full triggering of the first volumetric flow of hydraulic fluid in the direction of the cylinder piston surface chambers 16. The valve group is switched into the pressure buildup triggering mode, which is also illustrated in FIG. 2*c*. As has already been explained above, the reservoir connecting valve 29 is reliably closed in this pressure buildup triggering mode. This triggering mode is illustrated in FIG. 3*a*; the pressure in the first line system 28 should be higher than the pressure in the reservoir system 6 so that the shuttle valve 5, produces a pressure-carrying connection of the first line system 28 to the control surface C of the reservoir connecting valve 29 along the path depicted by the arrows a, b' through f in FIG. 3*a*. The connections to the base surface A and the annular surface B are produced as in the other triggering modes, via the path indicated by the arrows a, b and g through i illustrated in FIG. 3*a*.

Now the pressure buildup in the cylinder piston surface chambers 16 begins. To that end, the first volumetric flow of hydraulic fluid from the pump system 15 is diverted to the cylinder piston surface chambers 16 by a switching of the 2/2-way valve 14 into the switched position illustrated in FIG. 2*c*. Since, as has been explained above, it is not known precisely when the force necessary to overcome the static friction force $F_H$ will be reached or when the pressure necessary to achieve this force will be reached in the cylinder piston surface chambers 16, the pressure is simply increased slowly until, with the abrupt overcoming of the static friction force $F_K$, the movement of the mold 20 and the pistons 9 begins.

Because of the abrupt overcoming of the static friction force $F_H$, the axis is accelerated downward by the compression volume that has been stored in the cylinder piston surface chambers 16 and is now abruptly being released. However, due to the effect of the compressive prestressing in the fluid 17 and the “quasi-preopening” of the load compensation valve 1, no damage to the control apparatus and the piston/cylinder arrangements occurs despite the pressure load that occurs. A reliable cushioning of the mold 20 is assured.

When the distance measuring system 27 registers the initiated movement of the mold 20 and pistons 9 and signals this information to the control unit 23, this starts the next method phase. The mold 20 should be moved into a removal position. This occurs at first in an impeller control mode by means of the first volumetric flow of hydraulic fluid coming from the pump system 15. The control unit 23 thus switches the pump output of the pump system 15 to an output value that permits, through a corresponding first volumetric flow of hydraulic fluid, the traveling movement of the mold 20 to occur at a speed value calculated by the control unit 23. In this case, the pressure in the first line system (28) is less than the pressure in the reservoir system 6. The traveling motion could now also be guided to its end by reducing the first volumetric flow of hydraulic fluid from the pump system. According to the invention, however, the movement continues in a different way.

Figure 3B:
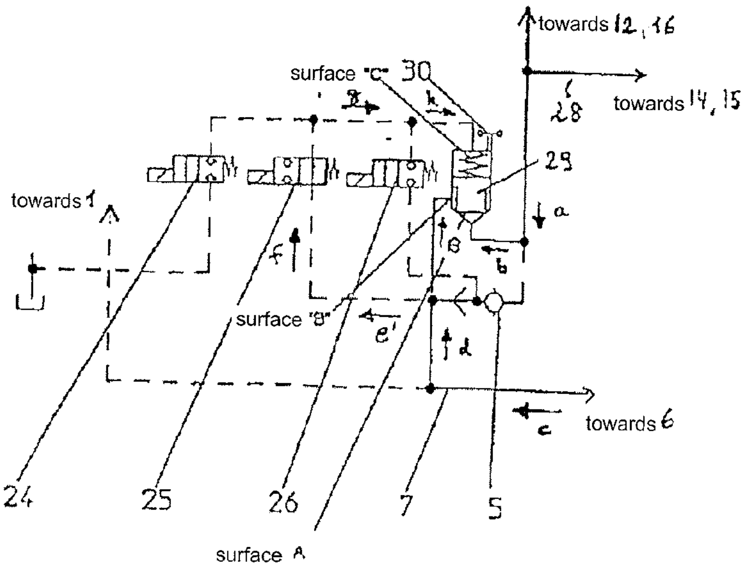
FIG. 3*b* illustrates the valve group in a first triggering mode (brake triggering mode) before a reservoir connecting valve opens.
Figure 3C:
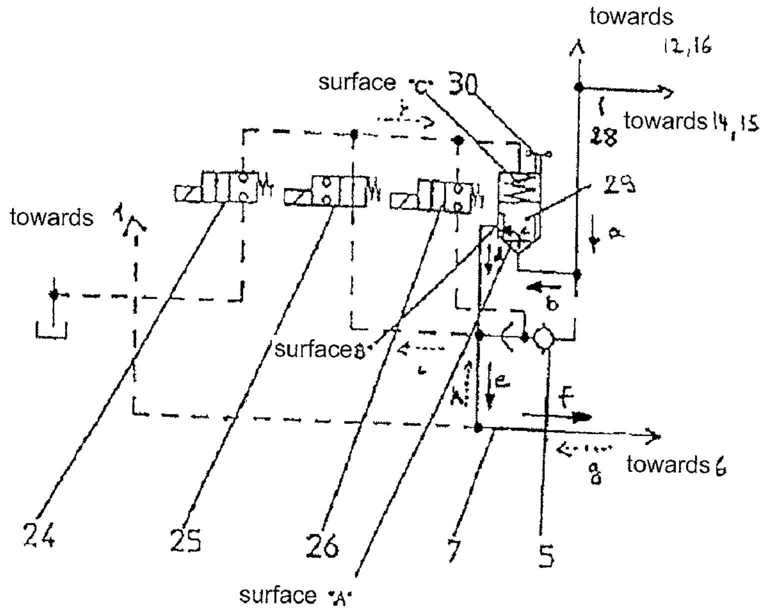
FIG. 3*c* illustrates the valve group in the first triggering mode in which the reservoir connecting valve conveys an excess portion of a first volumetric flow of hydraulic fluid to a reservoir system.

The valve group is triggered in the brake triggering mode so as to produce the pressure situation in the reservoir connecting valve 29 illustrated in FIG. 3*b*. As always, the base surface A of the reservoir connecting valve 29 is connected to the first line system 28 and the annular surface B is connected to the second line system 7, depicted here by the arrows a, b, and c through e. The control surface C is likewise connected to the second line system 7, as indicated by the arrows c, d, e", and f through h in FIG. 3*b*. In this situation, the reservoir connecting valve 29 is closed, but can be opened as soon as the pressure in the first line system 28 rises to the level of the pressure in the reservoir system 6 plus the 4 bar required to overcome the spring force in this exemplary embodiment.

At a braking time calculated by the control unit 23, the control unit 23 triggers the 2/2-way valve so that the first volumetric flow of hydraulic fluid is throttled. This produces the transition from the impeller control mode to a throttle control mode and the movement of the mold is correspondingly braked. In this case, the first volumetric flow of hydraulic fluid coming from the pump system 15 remains set to the same value. The throttling with the simultaneous maintenance of the same pump output increases the pressure in the first line system 28. If the pressure in the first line system 28 reaches the above-mentioned pressure threshold, then the reservoir connecting valve 29 opens, yielding the situation depicted in FIG. 3*c*.

The remaining excess portion of the first volumetric flow of hydraulic fluid coming from the pump system 15 is conveyed into the reservoir system 6 by the open reservoir connecting valve 29. This occurs along the path indicated by the arrows a through f in FIG. 3*c*. This diversion is important since the pump system 15 reacts more slowly (250 ms) than the throttling is produced (50 ms) and during the reaction time difference (200 ms), pressure peaks would otherwise occur in the first line system. The pressure conditions around the reservoir connecting valve 29 are now highly dynamic. To be precise, there is not only the connection of the control surface C to the reservoir system 6 indicated by the arrows g through j illustrated in FIG. 3*c*, but also a connection of the first line system 28 to the control surface C indicated by the arrows a through d, i, and j. As a result, the reservoir connecting valve 29 is in a labile equilibrium immediately after the opening occurs.

Figure 3D:
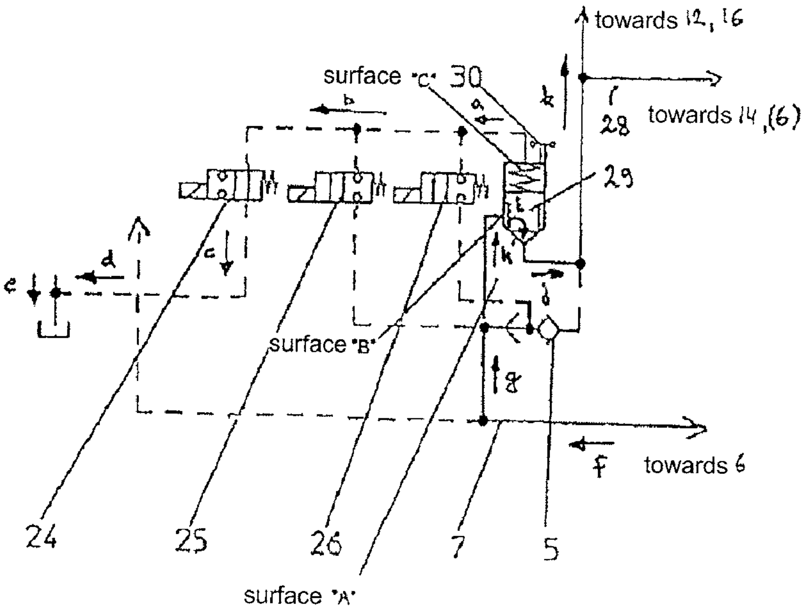
FIG. 3*d* illustrates the valve group in a second triggering mode (positioning triggering mode).

In another phase of the method, this labile equilibrium state of the reservoir connecting valve 29 is then ended and a hydraulic fluid supply of the traveling motion is supplied from the reservoir system 6. To be precise, the sensor 30 immediately registers the opening of the reservoir connecting valve 29 and signals this information to the control unit 23. Then the control unit 23 switches the valve group into the positioning triggering mode. The resulting situation is illustrated in FIG. 3*d*. The closing of the valve 25 shuts off the connection of the control surface C to the reservoir system 6 and first line system 28. At the same time, the opening of the valve 24 relieves the pressure on the control surface C into the tank, as indicated by the arrows a through e in FIG. 3*d*. The relief of the pressure on the control surface C naturally results in the reliable opening of the reservoir connecting valve 29 and therefore the production of a connection from the reservoir system 6 to the cylinder piston surface chambers 16. Then the hydraulic fluid supply required for the completion of the traveling motion of the mold 20 occurs via this connection along the path indicated by the arrows f-k in FIG. 3*d*.

The throttling of the 2/2-way valve 12 would in fact already have initiated the braking of the traveling motion. Now, the final phase of the method involves the precise positioning of the mold in the desired end position. To that end, the hydraulic fluid supply now coming from the reservoir system 6 is throttled further through the triggering of the 2/2-way valve 12 by the control unit 23 and as a result, in the throttle control mode, the desired parking position of the mold is achieved to a precision of 0.01 mm. The demolding procedure is completed when the parking position is reached.

A traveling motion of the mold 20 back up to a filling height for another work cycle can then occur in a fashion analogous to the corresponding method phase of the demolding procedure; naturally the 2/2-way valve is switched into the straight switched position for the upward movement. Here once again, the acceleration and fast-motion travel of the mold 20 occurs in an impeller control mode supplied from the pump system 15 and the transition from the impeller control mode into a throttle control mode occurs with a subsequent switching of the hydraulic fluid supply, which, for the positioning, once again comes from the reservoir system 6.

The control unit 23 that controls the entire sequence is an electronic control unit, which is designed not so that it can only carry out always the same chronological sequence of operating sequences with the same travel speeds and travel paths, but in the contrary, is able to vary the chronological sequence of the operating sequences in that, for example, travel speeds and travel paths and even the braking time can be activated differently from cycle to cycle. On the one hand, these travel speeds, travel paths, and the braking time can be calculated by the electronic control unit 23 and on the other hand, it is also conceivable for these values to be entered manually.

The invention is not limited solely to the exemplary embodiments described above. Instead, the defining characteristics of embodiments of the invention disclosed in the description and claims can be essential to the implementation of the various embodiments of the invention, both individually and in any combination with one another.

The invention claimed is:

1. An apparatus comprising:

a cylinder;

a piston disposed, at least in part, in the cylinder and dividing an interior of the cylinder along a longitudinal axis of the cylinder into two subchambers;

a valve arrangement connected to a first subchamber of the cylinder and configured to assume a closed position to prevent a fluid contained in the first subchamber from flowing out of the first subchamber if a pressure of the fluid is less than a predetermined pressure control value of the valve arrangement, and further configured to assume an open position to enable an outflow of the fluid if the pressure of the fluid is greater than the predetermined pressure control value; and a prestressing device coupled to the valve arrangement and the first subchamber, wherein the prestressing device is configured to damp a pressure load in a form of an abrupt pressure increase in the fluid brought about by a movement of the piston due at least in part to a load acting on the piston in a direction toward the first subchamber and produced through a relief of the pressure in a compression volume formed in the second subchamber, and wherein the prestressing device is configured to generate, independently of the load, a pressure increase in the fluid to a predetermined compressive prestressing value.

2. The apparatus of claim 1, wherein the compressive prestressing value is substantially equal to the pressure control value.

3. The apparatus of claim 1, wherein the compressive prestressing value is greater than the pressure control value by approximately 0.1% or more.

4. The apparatus of claim 3, wherein the compressive prestressing value is greater than the pressure control value by approximately 0.5% or more.

5. The apparatus of claim 4, wherein the compressive prestressing value is greater than the pressure control value by approximately 1% or more.

6. The apparatus of claim 1, wherein the difference between the compressive prestressing value and the pressure control value is 20% or less of the pressure control value.

7. The apparatus of claim 6, wherein the difference between the compressive prestressing value and the pressure control value is approximately 10% or less of the pressure control value.

8. The apparatus of claim 7, wherein the difference between the compressive prestressing value and the pressure control value is approximately 5% or less of the pressure control value.

9. The apparatus of claim 1, wherein the valve arrangement includes at least two stages, wherein the at least two stages includes a main stage and a preliminary stage, the main stage being configured to assume an open position and a closed position corresponding to an open position and a closed position of the valve arrangement, the open position being assumed when the preliminary stage is open, the valve arrangement being configured to assume the open position with a relatively low pressure relative to the pressure control value.

10. The apparatus of claim 9, wherein the preliminary stage and the main stage are hydraulically connected to the first subchamber, wherein the pressure of the fluid is present at the preliminary stage and a load side of the main stage, the pressure of the fluid counteracting closing of the main stage, and wherein the pressure of the fluid is present at a control side of the main stage, a pressure impingement counteracting opening of the main stage.

11. The apparatus of claim 10, wherein a length of a connection between the first subchamber and the control side is greater than a length of a connection between the first subchamber and the load side, wherein at least part of the connection between the first subchamber and the control side includes a bypass line.

12. The apparatus of claim 11, wherein the prestressing device includes a reservoir system from which the pressure increase is produced via a line system.

13. The apparatus of claim 12, wherein the line system includes a section connected to a pilot control line, the pilot control line connecting the preliminary stage and the control side of the main stage.

14. The apparatus of claim 13, wherein at least one of the bypass line, the pilot control line, or the section includes a throttle system.

15. The apparatus of claim 12, wherein in a static state of the fluid, the pressure increase produced by the prestressing device is continuous and wherein the pressure of the fluid is equal to the pressure of the reservoir system.

16. The apparatus of claim 9, wherein the pressure control value is adjustable.

17. The apparatus of claim 16, further comprising a control unit, wherein the pressure control value is proportionally controllable by a control voltage set by the control unit, and wherein the valve arrangement and the preliminary stage is magnetically adjustable.

18. The apparatus of claim 1, wherein the valve arrangement has a reaction time in a range of 1 milliseconds (ms) to 50 ms.

19. The apparatus of claim 18, wherein the reaction time is in a range of 1 ms to 20 ms.

20. The apparatus of claim 19, wherein the reaction time is in a range of 1 ms to 5 ms.

21. The apparatus of claim 1, further comprising:

a pump system configured to supply, in a first operating mode, a first volumetric flow of a hydraulic fluid to a second subchamber for relatively moving the piston in a direction toward the first subchamber, wherein the pump system is configured to supply the first volumetric flow at least in part by a first line system, and wherein the pump system is further configured to supply, in a second operating mode, a second volumetric flow of the hydraulic fluid from a reservoir system and at least in part by a second line system;

means for switching from the first operating mode to the second operating mode, wherein the means for switching includes means for producing an increase in a pressure prevailing in the first line system in which a throttling of the first volumetric flow of hydraulic fluid produces the pressure increase in the first line system;

a throttle valve controllable to throttle the first volumetric flow;

means for automatically opening a connection between the reservoir system and the second subchamber when the pressure prevailing in the first line system exceeds a predetermined threshold in a first triggering mode; and means for maintaining the connection in a second triggering mode;

wherein the means for switching is designed so that an excess portion of the first volumetric flow of hydraulic fluid generated by throttling of the first volumetric flow is conveyed into the reservoir system by the pump system when the threshold is exceeded.

22. The apparatus of claim 21, wherein the threshold is determined at least in part by the pressure prevailing in the reservoir system.

23. The apparatus of claim 21, further comprising a connecting valve arrangement configured to open the connection, the connecting valve arrangement including a reservoir connecting valve having with a first connection communicatively coupled with the first line system, and further having a second connection communicatively coupled with the second line system, the connecting valve arrangement configured to counteract a closing of the reservoir responsive to the pressure of the fluid, wherein the connecting valve arrangement is configured to open the connection by unblocking of a pathway between the first connection and the second connection.

24. The apparatus of claim 23, further comprising a reservoir connecting valve, and wherein the connecting valve arrangement is configured to open the connection by opening the reservoir connecting valve.

25. The apparatus of claim 24, wherein the reservoir connecting valve includes a third connection configured to counteract the opening of the reservoir connecting valve the pressure of the fluid on the third connection, the third connection coupled to a valve group having a first valve configured to open in a first triggering mode and open a pathway from the third connection to the second line system.

26. The apparatus of claim 25, wherein in the reservoir connecting valve, the sum of effective surfaces of the first connection and the second connection is substantially equal to an effective surface of the third connection, and wherein the apparatus further comprises a closing element configured to close the reservoir connecting valve in compensated pressure conditions having a compensation pressure corresponding to the effective surface of the first connection and wherein the threshold is a sum of the compensation pressure and a pressure prevailing in the reservoir system.

27. The apparatus of claim 26, wherein the closing element is a spring.

28. The apparatus of claim 25, wherein the valve group includes a second valve configured, in an open position, to relieve a pressure in the third connection and maintain a pathway between the reservoir system and the second subchamber.

29. The apparatus of claim 28, wherein the reservoir connecting valve includes a sensor configured to register an opening of the pathway between the reservoir system and the second subchamber.

30. The apparatus of claim 28, further comprising means for preventing, in a third triggering mode, an opening of the pathway between the reservoir system and the second subchamber.

31. The apparatus of claim 30, wherein the valve group includes a third valve and wherein the reservoir connecting valve is configured to lock when the third valve is in an open position in the third triggering mode, the reservoir connecting valve being configured to lock when a selected one of the first and the second line systems has a higher pressure relative to the non-selected one of the first and the second line systems, and wherein a fourth valve is coupled to the first and the second line systems and is configured to select the one of the first and the second line systems.

32. The apparatus of claim 21, further comprising a decoupling valve configured to disconnect the pump system from the first line system in the second triggering mode.

33. A method comprising:

producing a relative movement between a piston and a cylinder of a piston/cylinder arrangement in an impeller control mode by means of a first volumetric flow of a hydraulic fluid generated by a pump system, the relative movement functioning as a hydraulic fluid supply;

throttling the first volumetric flow, the throttling including transitioning from the impeller control mode to a throttle control mode;

automatically opening a pathway between the pump system and the reservoir system;

braking the relative movement and conveying an excess portion of the hydraulic fluid of the first volumetric flow into a reservoir system by means of the pathway between the pump system and the reservoir system; and maintaining the pathway between the pump system and the reservoir system, the hydraulic fluid supply for the braked relative movement occurring by means of a second volumetric flow of hydraulic fluid from the reservoir system via the pathway between the pump system and the reservoir system.

34. The method of claim 32, wherein the throttling begins at a braking time calculated by the control unit.

35. The method of claim 32, wherein the automatic opening of the pathway is performed by means of a reservoir connecting valve controlled by a valve group, the reservoir connecting valve coupled to the pump system via a first line system communicatively coupled with a first connection and further coupled to the reservoir system via a second line system communicatively coupled with a second connection.

36. The method of claim 35, further comprising opening, in a first triggering mode, a first valve of the valve group, and when the first valve is open, performing the automatic opening as soon as a pressure in the first line system exceeds a predetermined threshold due to an increase caused by the throttling.

37. The method of claim 36, further comprising:

triggering a control unit by registering the opening of the second valve by a sensor provided in the reservoir connecting valve and conveying by the sensor a corresponding signal to the control unit while the first valve is closed;

in response to the triggering of the control unit, opening, in a second triggering mode, a second valve of the valve group to relieve a pressure in a third connection of the reservoir connecting valve, wherein the pathway is maintained due at least in part to the opening of the second valve; and in response to the triggering of the control unit, switching the first volumetric flow of hydraulic fluid away from a pathway with the second subchamber.

38. The method of claim 37, further comprising:

in the second triggering mode, throttling the second volumetric flow of hydraulic fluid from the reservoir system; and stopping the relative movement and assuming a relative movement end position between the piston and the cylinder due at least in part to the throttling of the second volumetric flow.

39. The method of claim 37, further comprising:

triggering a control unit; and in response to the triggering of the control unit:

opening a third valve of the valve group in a third triggering mode;

closing the first valve;

selecting by a fourth valve one of the first and the second line systems having a higher pressure relative to a non-selected one of the first and the second line systems;

closing the second valve in response to a non-triggering of the control unit and preventing the opening of the second valve by means of a pathway between the third connection and the selected one of the first and the second line systems; and locking the reservoir connecting valve in a closed position.

40. The method of claim 39, wherein the opening of the third valve is performed prior to the producing of the relative movement between the piston and the cylinder.

41. A method comprising increasing a pressure in a fluid to a predetermined compressive prestressing value independent of a load acting on a piston in the direction of a first subchamber of the piston so that a damping is prepared for a pressure load in a form of an abrupt pressure increase in the fluid brought about by a movement of the piston due at least in part to the load acting on the piston in the direction of the first subchamber and produced through a relief of a pressure in a compression volume formed in a second subchamber.

42. The method of claim 41, further comprising:

producing a volumetric flow of hydraulic fluid by a pump system; and increasing a pressure and a load in the hydraulic fluid contained in the second subchamber until a movement of the piston in the direction of the first subchamber is initiated upon an overcoming of a holding force counteracting the load.

43. The method of claim 42, further comprising:

prior to the movement of the piston in the direction of the first subchamber:

triggering a control unit; and in response to the triggering of the control unit:

opening a third valve of the valve group in a third triggering mode;

closing the first valve;

selecting by a fourth valve one of the first and the second line systems having a higher pressure relative to a non-selected one of the first and the second line systems;

closing the second valve in response to a non-triggering of the control unit and preventing the opening of the second valve by way a pathway of the third connection with the selected one of the first and the second line systems; and locking the reservoir connecting valve in a closed position;

registering the movement of the piston in the direction of the first subchamber by a distance measuring system and conveying a corresponding signal to the control unit; and after the registering of the movement, switching the control unit to the impeller control mode.

44. A method comprising:

providing an apparatus including:

a cylinder;

a piston disposed, at least in part, in the cylinder and dividing an interior of the cylinder along a longitudinal axis of the cylinder into two subchambers;

a valve arrangement connected to a first subchamber of the cylinder and configured to assume a closed position to prevent a fluid contained in the first subchamber from flowing out of the first subchamber if a pressure of the fluid is less than a predetermined pressure control value of the valve arrangement, and further configured to assume an open position to enable an outflow of the fluid if the pressure of the fluid is greater than the pressure control value; and a prestressing device coupled to the valve arrangement and the first subchamber, wherein the prestressing device is configured to damp a pressure load in a form of an abrupt pressure increase in the fluid brought about by a movement of the piston due at least in part to a load acting on the piston in a direction of the first subchamber and produced through a relief of the pressure in a compression volume formed in the second subchamber, and wherein the prestressing device is configured to generate independently of the load a pressure increase in the fluid to a predetermined compressive prestressing value;

pressing an item in a mold using the apparatus; and performing a demolding operation including removing the item from the mold.

45. The method of claim 44, wherein the providing of the apparatus comprises providing a hydraulic press.

46. The method of claim 45, wherein the providing of the hydraulic press comprises providing a hydraulic press configured to manufacture tiles.

47. The method of claim 46, wherein the providing of the hydraulic press comprises providing a hydraulic press configured to manufacture fireproofing tiles.

48. The method of claim 44, wherein the providing of the apparatus comprises providing the apparatus including the piston and the cylinder disposed along an auxiliary working axis for the demolding operation.

* * * * *